(12) United States Patent
Ertel

(10) Patent No.: US 8,042,682 B2
(45) Date of Patent: Oct. 25, 2011

(54) CONVEYOR BELT DRIVE SPROCKET RETENTION SYSTEM

(75) Inventor: Daniel E. Ertel, Oconomowoc, WI (US)

(73) Assignee: Dorner Mfg. Corp., Hartland, WI (US)

( * ) Notice: Subject to any disclaimer, the term of this patent is extended or adjusted under 35 U.S.C. 154(b) by 145 days.

(21) Appl. No.: 12/403,717

(22) Filed: Mar. 13, 2009

(65) Prior Publication Data

US 2010/0230249 A1    Sep. 16, 2010

(51) Int. Cl.
B65G 23/06    (2006.01)
(52) U.S. Cl. ........................................ 198/834
(58) Field of Classification Search .................. 198/834, 198/788; 474/164
See application file for complete search history.

(56) References Cited

U.S. PATENT DOCUMENTS

| | | | |
|---|---|---|---|
| 2,807,485 A | 9/1957 | Seibert | |
| 3,597,988 A | 8/1971 | Hecketsweiler | |
| RE30,341 E * | 7/1980 | Lapeyre | 198/834 |
| 4,338,078 A * | 7/1982 | Lampkin | 432/11 |
| 4,864,878 A * | 9/1989 | Pralle | 74/15.6 |
| 4,886,158 A * | 12/1989 | Lapeyre | 198/853 |
| 5,186,309 A * | 2/1993 | Wleklinski | 198/606 |
| 5,253,748 A | 10/1993 | Ledet | |
| 5,263,575 A | 11/1993 | Ledet | |
| 5,469,958 A | 11/1995 | Gruettner et al. | |
| 5,518,109 A | 5/1996 | Dailey et al. | |
| 5,531,537 A | 7/1996 | Pink et al. | |
| 5,544,740 A * | 8/1996 | Kissee | 198/834 |
| 5,934,447 A | 8/1999 | Kanaris | |
| 6,227,354 B1 * | 5/2001 | Howden et al. | 198/834 |
| 6,279,752 B1 * | 8/2001 | Hannum | 210/525 |
| 6,758,776 B2 | 7/2004 | Fye et al. | |
| 7,147,099 B2 | 12/2006 | Guernsey et al. | |
| 7,207,435 B2 | 4/2007 | Bude et al. | |
| 7,244,205 B2 | 7/2007 | Kanaris | |
| 7,726,467 B1 * | 6/2010 | Schoonover et al. | 198/618 |
| 2005/0061633 A1 | 3/2005 | Vetter | |

* cited by examiner

Primary Examiner — Joseph A Dillon, Jr.
(74) Attorney, Agent, or Firm — Andrus, Sceales, Starke & Sawall, LLP

(57) ABSTRACT

A drive sprocket retention system is provided for use in a belt conveyor in which a plurality of drive sprockets are mounted on a rotatable element having an axial keyway formation. The retention system is defined by a key arrangement disposed in the keyway formation of the rotatable element, wherein a recessed portion of a key is received and retained between each drive sprocket and the rotatable element without the need for threaded fasteners. The retention system is movable between a locked position and a release position, wherein the spacing between the drive sprockets is substantially fixed when the retention system is in the locked position, and the drive sprockets are independently movable along the longitudinal length of the rotatable element when the retention system is in the release position.

19 Claims, 7 Drawing Sheets

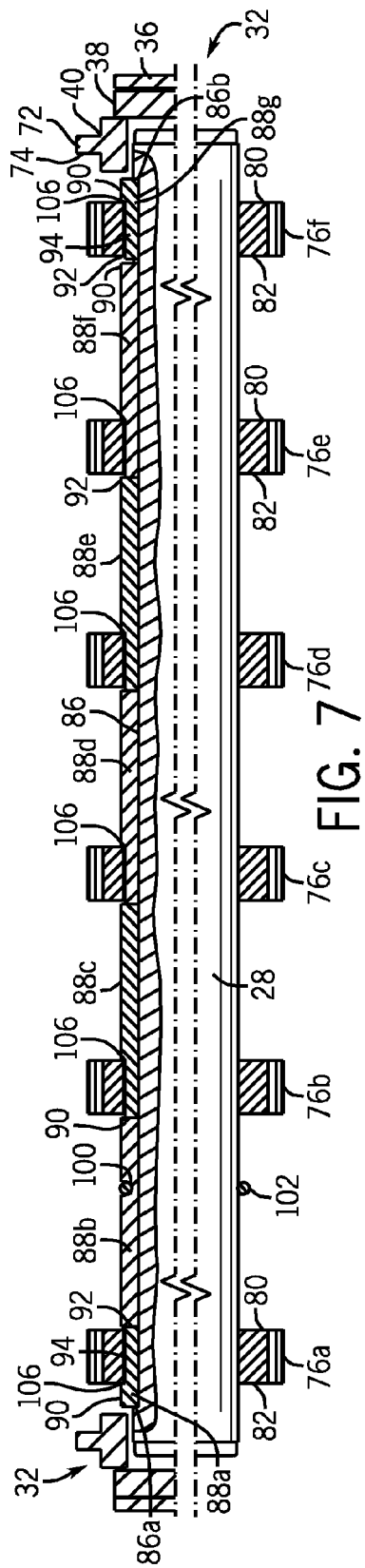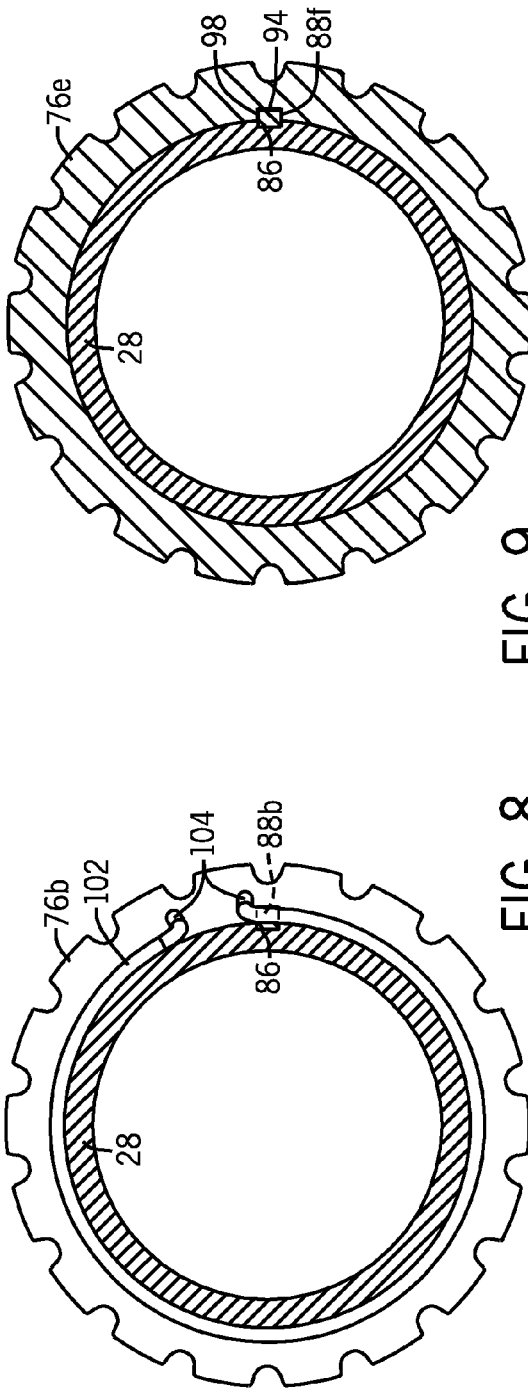
FIG. 7
FIG. 8
FIG. 9

CONVEYOR BELT DRIVE SPROCKET RETENTION SYSTEM

FIELD OF THE INVENTION

The present disclosure generally relates to a conveyor that is particularly useful in a sanitary environment. More specifically, the present disclosure relates to a retention system that can be used to maintain the desired spacing between drive sprockets used to drive a continuous conveyor belt.

BACKGROUND

Presently, in food processing conveyor applications, conveyors must be manufactured such that the conveyor belt can be removed and the entire conveyor frame assembly sanitized. Following sanitation, the conveyor belt must be reinstalled for continued operation. Numerous guidelines exist to regulate the type of conveyor assembly that can be used in a sanitary environment, such as in a food processing facility. Typically, these guidelines require that the conveyor frame assembly must be capable of being disassembled and sanitized. Since the conveyor frame assembly must be sanitized on a regular basis, the conveyor assembly must be capable of being quickly disassembled to allow complete cleaning. Preferably, the disassembly should require no tools.

The food processing guidelines for conveyors also require that the conveyors not include any areas that collect water after the conveyor has been washed down. If the conveyor includes areas that collect water, bacteria can form in the wet areas, which is unacceptable in a sanitary environment. Therefore, the conveyors used in the food processing industry must prevent water from pooling after the conveyor assembly has been washed down.

In many uses of sanitary conveyors, the conveyor belt is a plastic chain conveyor belt that is driven by a series of drive sprockets positioned near one end of the conveyor assembly. Each of the drive sprockets is positioned along a rotatable drive element such as a drive roller, which is coupled to a drive motor. Traditional conveyors include a drive motor and gear assembly that are located external to the drive roller. To conserve space, some conveyors include a drive motor and a gear reducer that are carried within the interior of the drive roller. Such internally driven drive rollers, known as motorized pulleys, have sealed components ideal for sanitary applications.

In conveyors that include internally driven drive rollers, the outer diameter of the driver roller is relatively large as compared to conveyors that include drive rollers driven by external motors. Since the internally driven drive roller has a relatively large outer diameter, the drive sprockets positioned along the outer circumference of the drive roller increase the overall size of the drive assembly. In most applications, it is desired for the conveyor to have as low a profile as possible to reduce the space requirements for the conveyor assembly.

Since the conveyor assembly is used in a sanitary environment, the drive sprockets must be movable along the length of the drive roller such that during cleaning, the areas of the drive roller under the drive sprockets can be cleaned. However, during normal conveyor operation, the drive sprockets are attached to the drive roller to prevent rotational and axial movement of the drive sprockets relative to the drive roller. The attachment between the drive sprockets and the drive roller facilitates torque transfer to the conveyor belt and avoids alignment problems between the drive sprockets and the conveyor belt.

Therefore, it is desirable to provide a keyed retention system that provides the driving engagement between the drive sprockets and the drive roller, and substantially maintains the axial position of the drive sprockets on the drive roller without the need for threaded fasteners. It is further desirable to provide a keyed retention system which is retained along the drive roller during normal conveyor operation yet can be easily released to allow the drive sprockets to slide freely along the drive roller during cleaning. It is further desirable to provide drive sprockets that have a low profile to provide for a drive assembly with an internally driven drive roller that has a low profile such that the overall height of the conveyor assembly can be as small as possible.

SUMMARY

The present disclosure relates to a drive arrangement for use with a conveyor assembly having a continuous conveyor belt supported by a conveyor frame having a pair of spaced side members. A driven rotatable element is supported between the pair of spaced side members and located at one end of the conveyor frame. A plurality of drive sprockets is positioned along the rotatable element for transmitting a drive force between the rotatable element and the conveyor belt. Each of the drive sprockets is freely movable along the longitudinal length of the rotatable element. A drive sprocket retention system is disposed between the drive sprockets and the rotatable element to substantially maintain the desired spacing between the drive sprockets. In the drive sprocket retention system, a recessed portion of a key is received and retained between each drive sprocket and the rotatable element without the need for threaded fasteners.

The drive sprocket retention system is movable between a locked position and a release position wherein the spacing between the drive sprockets is substantially fixed when the retention system is in the locked position, and the sprockets are independently movable along the longitudinal length of the rotatable element when the retention system is in the release position. Engagement of the recessed portion of the key between each drive sprocket and rotatable element prevents rotational movement of each drive sprocket relative to the rotatable element.

Each key having a recessed portion received and retained between each drive sprocket and the rotatable element forms a series of keys arranged in an end-to-end relationship and disposed in a keyway formed in the rotatable element. The end-to-end relationship of the keys forms a first set of stop shoulders engageable with the drive sprockets. The keys having recessed portions form a second set of stop shoulders engageable with the drive sprockets. The series of keys includes at least one key that is fixed on the rotatable element between a pair of drive sprockets by a retaining ring surrounding the rotatable element. The drive sprockets have inner walls forming bores that are slidably accommodated on the rotatable element. Each of the walls has slots formed therein for receiving the recessed portion of the keys. In the preferred embodiment, the rotatable element is mounted between a pair of support assemblies which are removably attached to the spaced side members of the conveyor frame.

In another aspect of the disclosure, a drive sprocket retention system is provided for use in a belt conveyor in which a plurality of drive sprockets are mounted on a rotatable element having an axial keyway formation. The retention system is defined by a key arrangement disposed in the keyway formation of the rotatable element wherein a recessed portion of a key is received and retained between each drive sprocket and the rotatable element without the need for threaded fasteners.

In another aspect of the disclosure, a drive arrangement is provided for use with a conveyor assembly having a continuous conveyor belt supported by a conveyor frame having a pair of spaced side members. The drive arrangement includes a drive roller having a shaft supported between the pair of spaced side members and located at one end of the conveyor frame. A plurality of drive sprockets is positioned along the drive roller for transmitting a drive force between the drive roller and the conveyor belt. Each of the drive sprockets is freely movable along the longitudinal length of the drive roller. Each of the drive sprockets has a low profile such that when the drive sprockets are positioned along the outer circumference of the drive roller, the combination of the drive sprockets and drive roller presents a low profile. The low profile of the drive arrangement allows the conveyor assembly to have a reduced overall height relative to prior art conveyor systems.

A drive sprocket retention system is disposed between the drive sprockets and the drive roller to prevent rotational and axial movement of the drive sprockets relative to the drive roll. The retention system is defined by a plurality of keys disposed in an axial keyway formed in the drive roller, and provided with recessed end portions received and retained between the drive sprockets and the drive roller. The keys are arranged in an end-to-end relationship along the keyway such that the keys by themselves form stop shoulders to engage against the sides of the drive sprockets to substantially prevent axial movement of the drive sprockets on the drive roller and maintain a desired spacing between the drive sprockets.

The drive roller is mounted between a pair of support assemblies that are removably attached to the spaced side members by a pin connection. Each support assembly includes a support bracket removably secured to one of the spaced side members, a support plate pivotally mounted to the support bracket and a belt guide mounted on the support bracket alongside the support plate and engageable with an edge of the conveyor belt. The support bracket and support plate are formed with cooperating slots for locating, receiving and retaining the drive roller shaft.

BRIEF DESCRIPTION OF THE DRAWINGS

The drawings illustrate the best mode presently contemplated of carrying out the disclosure.

In the drawings:

FIG. 7 is a fragmentary sectional view taken on line 7-7 of FIG. 5;

FIG. 8 is a sectional view taken on line 8-8 of FIG. 5; and

FIG. 9 is a sectional view taken on line 9-9 of FIG. 5.

DETAILED DESCRIPTION OF THE DRAWINGS

Figure 1:
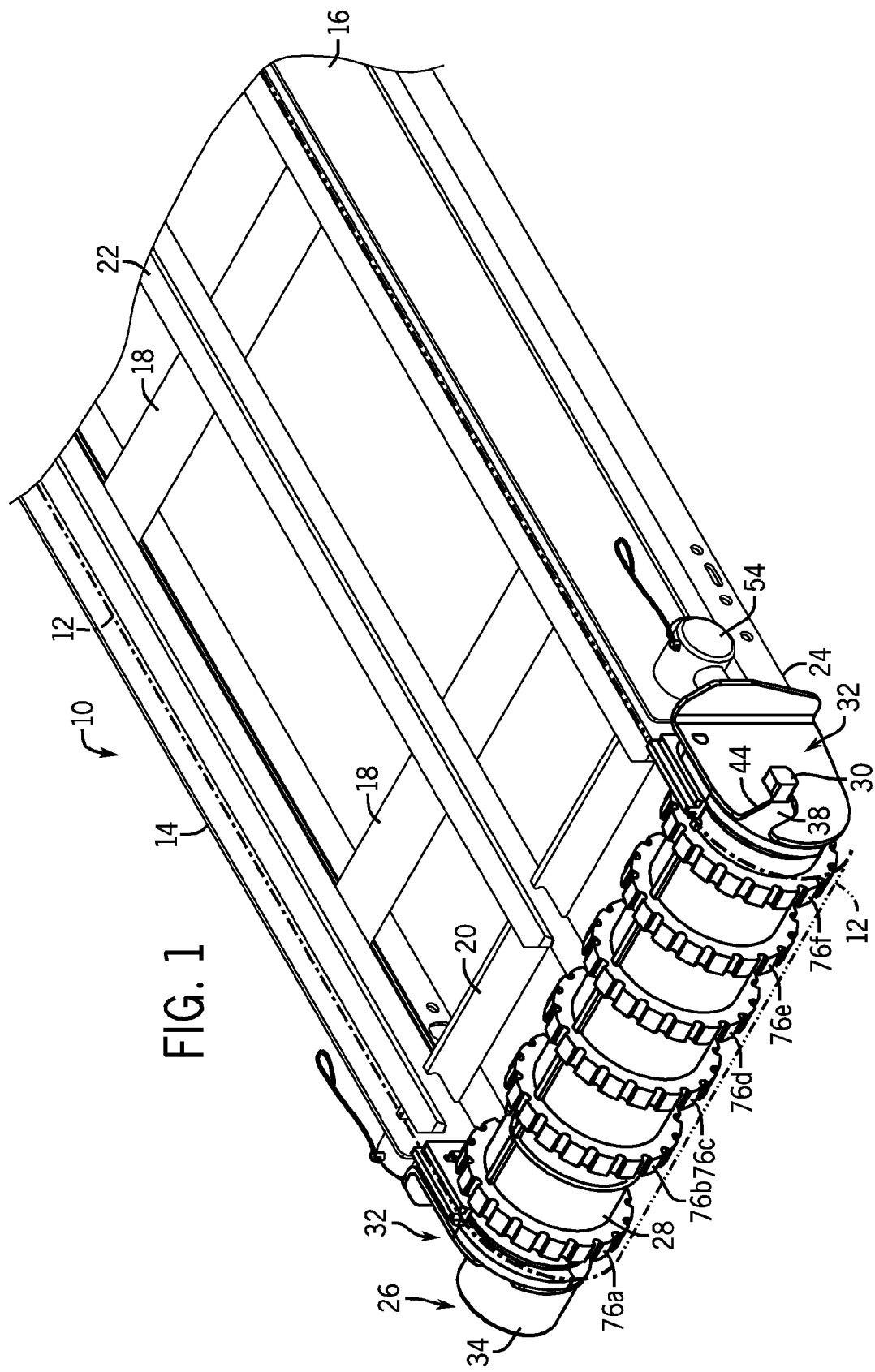
FIG. 1 is a perspective view of a conveyor assembly having a drive arrangement mounted between a pair of support assemblies, and provided with a drive sprocket retention system maintaining the position of the several drive sprockets in accordance with the disclosure.

FIG. 1 illustrates a conveyor assembly 10 that includes a continuous conveyor belt 12 used to transport articles. The conveyor assembly 10 includes a pair of spaced side frame members 14, 16 spaced from each other by the width of the conveyor belt 12. Side frame members 14, 16 are joined by a series of cross members 18 and rail supports 20. The rail supports 20 receive and support a series of spaced slide rails 22 that provide the support for the upper run of the conveyor belt 12.

As shown in FIG. 1, the pair of side frame members 14, 16 define a first end 24 for the conveyor assembly 12. The first end 24 is referred to as the drive end of the conveyor assembly 12 and includes a drive arrangement 26. The drive arrangement 26 provides the required motive force to move the continuous conveyor belt 12 relative to the stationary conveyor assembly 10.

In the preferred embodiment, the drive arrangement 26 of a drive roller 28 that enables movement of the conveyor belt 12. The drive roller 28 is driven by an internal electric motor and gear assembly (not shown), and is supported on a fixed shaft 30 which extends across the width of the conveyor assembly 10. Opposite ends of the fixed shaft 30 are formed with a square cross section, and are held in a pair of support assemblies 32 that are removably connected to the side frame members 14, 16.

Figure 3:
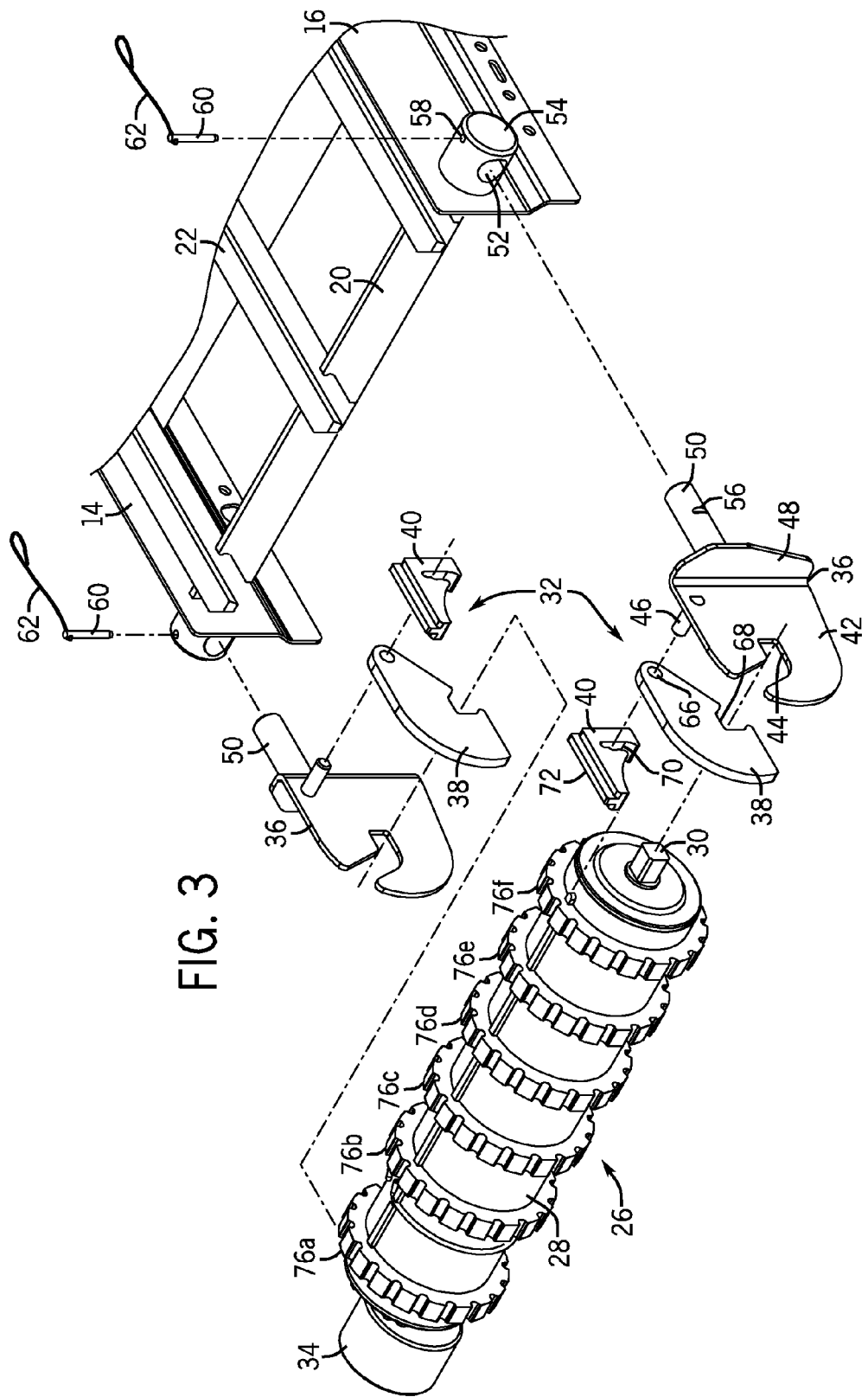
FIG. 3 is an exploded view of the drive arrangement, the drive sprocket retention system and the support assemblies.

As seen best in FIG. 3, each of the support assemblies 32 is comprised of a support bracket 36, a locking plate 38 and a belt guide 40. The support bracket 36 has a first plate portion 42 formed with a shaft locating and retaining slot 44, and a laterally extending pivot pin 46 which projects inwardly toward the drive roller 28. A second plate portion 48 is bent at substantially 90° relative to the first plate portion 42, and is provided with a support arm 50 extending perpendicularly therefrom. Each support arm 50 extends through and is supported by walls of a passageway 52 on a cross axle 54 provided on side frame members 14, 16. Support arm 50 has a slot 56 which is aligned with a recess 58 formed through cross axle 54 when the support arm 50 is received in the cross axle 54. A pin 60 is passed through the aligned slot 56 and recess 58 to attach each support bracket 36 to the respective side frame member 14, 16. One end of a pull tie 62 is attached to each pin 60 to prevent the pin 60 from falling through the aligned slot 56 and recess 58, and to allow for an easy extraction of the pin 60 when it is desired to decouple support bracket 36 from the side frame members 14, 16. The other end of the pull tie 62 can be secured to a retainer 64 (FIGS. 5 and 6) extending from each of the side frame members 14, 16 in order to prevent loss of the pin 60.

Each locking plate 38 has a hole 66 and a shaft retaining slot 68. Pivot pin 46 on support bracket 36 is designed to pass through and extend beyond the axial length of hole 64 so that locking plate 38 pivots relative to support bracket 36, and enables the end of the fixed shaft 30 to be retained by the walls defining the slots 44 and 68.

Each belt guide 40 is formed with a contoured slot 70 that receives the end of the D-shaped pivot pin 46 on support bracket 36 so that the belt guide 40 is held in place relative to the support bracket 36 and the locking plate 38. Each belt guide 40 includes an upper guide portion 72 with a T-shaped cross section having a guide surface 74 (FIG. 7) for guiding a lateral edge of the moving conveyor belt 12.

The support assemblies 32 formed by the support brackets 36, the locking plates 38 and the belt guides 40 cooperate to provide the required support for the fixed shaft 30 of the drive roller 28, and maintain the lateral stability of the conveyor 12 during normal operation of the conveyor assembly 10. However, as will be appreciated hereafter, the support assemblies 32 enable a quick, convenient uncoupling of the drive arrangement 26 from the spaced side members 14, 16 should it be desired to inspect, repair, replace or completely clean the drive roller 28, the drive sprocket retention system and the components of the support assemblies 32.

Figure 4:
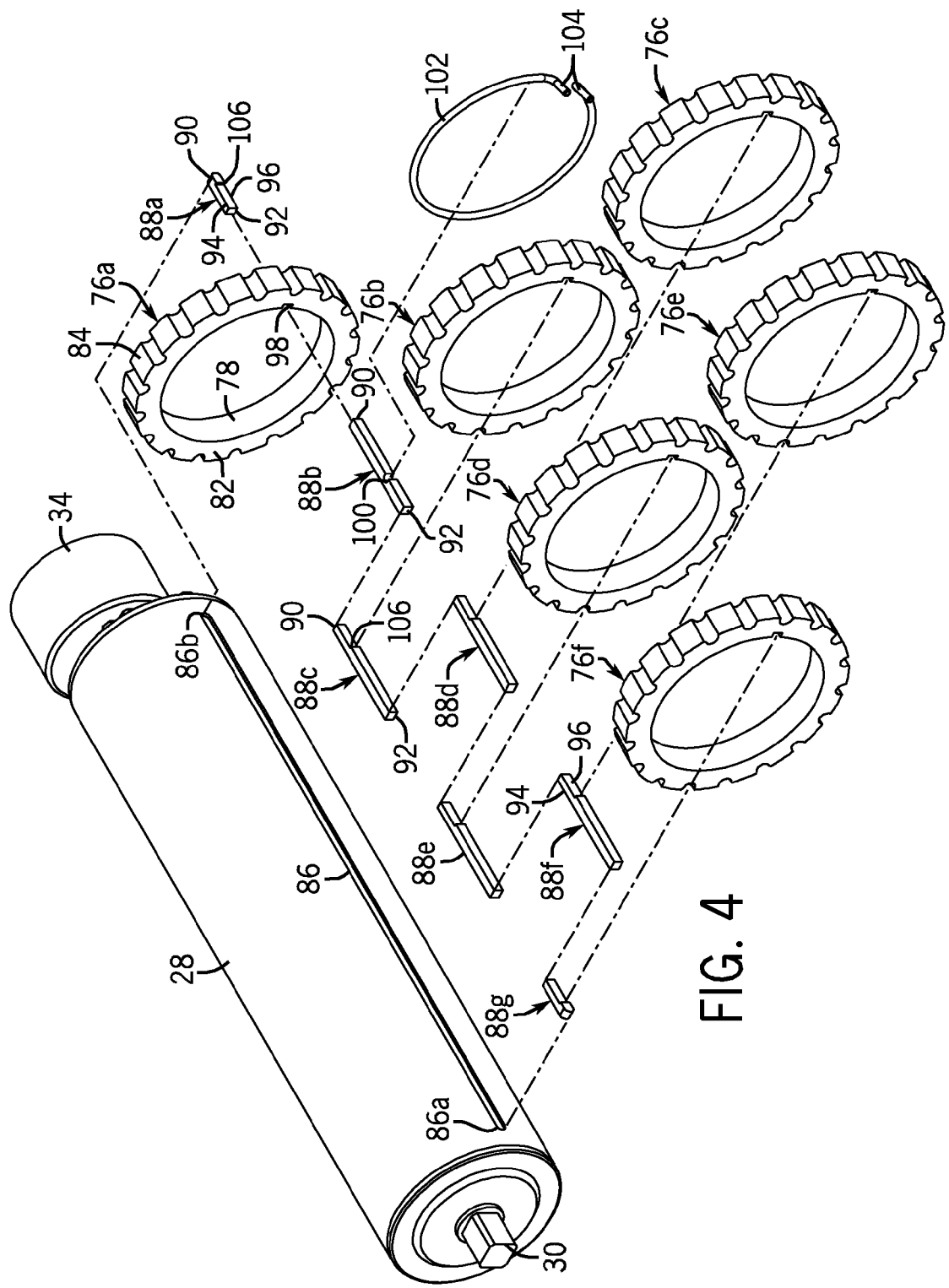
FIG. 4 is an exploded view of the drive arrangement, the drive sprocket retention system and the drive sprockets.

Referring to FIGS. 1-4, the drive roller 28 has a generally cylindrical outer surface that supports a plurality of drive sprockets 76a-76f that are evenly spaced along the longitudinal length of the drive roller 28. As illustrated in FIG. 4, each of the drive sprockets 76a-76f includes an inner wall 78 that defines a circular bore sized to allow the drive sprockets 76a-76f to rotate and slide along the outer surface of the drive roller 28. Each bore extends from a first side 80 to a second side 82 of each drive sprocket 76a-76f as seen in FIG. 7.

Each drive sprocket 76a-76f has a plurality of teeth 84 spaced along its outer periphery that are configured to engage openings contained in the conveyor belt 12. In the preferred embodiment, the conveyor belt 12 is a plastic chain link conveyor belt that includes drive slots formed between the links on the conveyor belt 12. An example of such a belt is a Spirlox brand conveyor belt sold by Intralox, LLC.

Preferably, the conveyor belt 12 is formed from plastic to provide the required durability and to permit sanitation of the conveyor belt 12. The spacing between the teeth 84 formed on each drive sprocket 76a-76f is selected for the specific conveyor belt used with the conveyor assembly 10. Typically, the conveyor belt manufacturer provides the specifications for the spacing between the teeth 84 such that the teeth spacing on the drive sprockets 76a-76f corresponds to the drive slots formed on the particular conveyor belt 12.

In the embodiment shown in FIG. 3, each of the drive sprockets 76a-76f has a relatively low radial profile as compared to previously used drive sprockets. As an example, in the embodiment shown in FIG. 1, the drive roller 28 has an outer circumference of 5 inches while each of the drive sprockets has a radial height of ⅝ inch. Although these dimensions are provided for illustrative purposes, the size of the drive roller 28 could vary. However, the drive sprockets 76a-76f are configured to have as low a profile as possible to reduce the overall profile of the drive assembly.

In accordance with the disclosure, a drive sprocket retention system is provided between the drive roller 28 and the drive sprockets 76a-76f to prevent rotation and substantially maintain the position of the drive sprockets 76a-76f relative to the drive roller 28. More specifically, the retention system is designed to maintain the desired longitudinal spacing between the drive sprockets 76a-76f along the longitudinal length of the drive roller 28. The desired spacing depends upon the specific conveyor belt configuration.

In the drive sprocket retention system shown in FIG. 4, the outer surface of the drive roller 28 includes an axial groove 86 extending along substantially the entire length of the drive roller 28. A series of rigid keys 88a-88g are formed in the shape of parallelepipedic bars, and are designed to fit in a substantially aligned, end-to-end relationship in the groove 86 which serves as a keyway. The outer dimensions of the keys 88a-88g are less than the dimensions of the mating groove 86 so that the keys fit therein. Groove 86 is provided with blind ends 86a, 86b so that the keys 88a-88g will not slide off the ends of the drive roller 28.

Each key 88a-88g has opposite terminal ends 90, 92 which serve as abutment surfaces that engage blind ends 86a, 86b of the groove 86, or adjacent ends of certain keys 88a-88g. Each of the keys 88a and 88c-88g is materially relieved or recessed on an end portion 94 thereof to form a flat surface 96. The bore wall 78 of each drive sprocket 76a-76f is formed with a slot 98 which extends along the axial length of the drive sprocket bore and is shaped to match the shape of the recessed end portion 94 of each key 88a and 88c-88g. Each drive sprocket 76a-76f slidably fits around the drive roller 28 over a corresponding key 88a and 88c-88g whose recessed end portions 94 allow it to reside partly in the groove 86 of the drive roller 28 and partly in the aligned slot 98 provided in each sprocket 76a-76f as depicted in FIG. 9. The registered engagement provided by the keys 88a and 88c-88g between each drive sprocket 76a-76f and the drive roller 28 permits rotational force of the drive roller 28 to be transmitted to the conveyor belt 12. Thus, it can be understood that the recessed keys 88a and 88c-88g are important in preventing the drive sprockets 76a-76f from slipping circumferentially on the drive roller 28 as the drive roller 28 rotates.

The keys 88a-88g also serve to substantially maintain the spacing of the drive sprockets 76a-76f along drive roller 28 by establishing an end-to-end relationship of the keys 88a-88g that create stop shoulders engageable with both sides 80, 82 of the drive sprockets 76a-76f. Preferably, the drive sprockets 76a-76f are substantially maintained in position axially along the drive roller 28 using the keys 88a-88g without the need for threaded fasteners to hold the keys in place.

Figure 5:
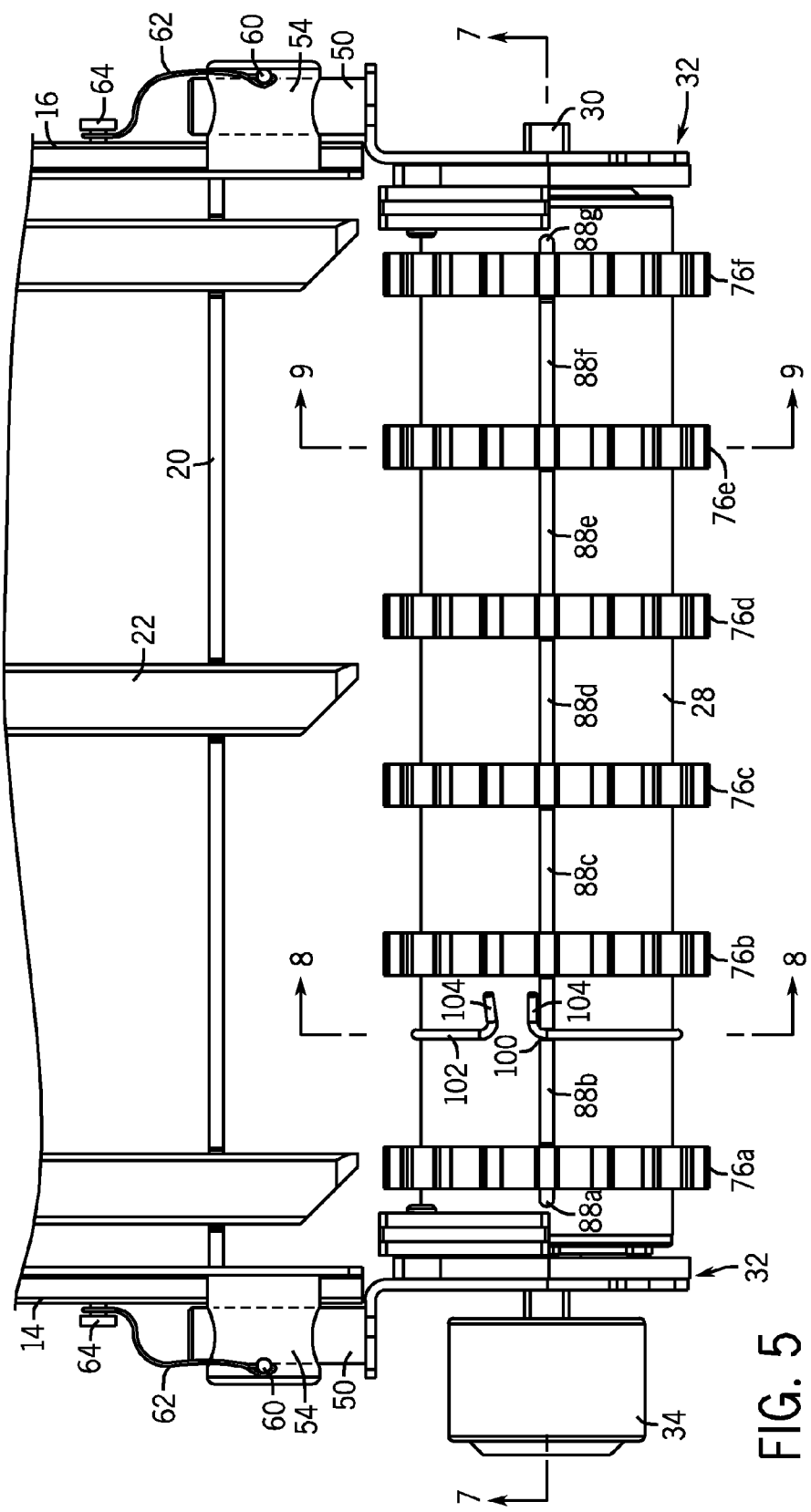
FIG. 5 is a top view illustrating the retention system in the locked position and engaged with the drive sprockets.

Referring further to FIG. 4, the key 88b is formed with a circular recess 100 between the ends 90, 92. In contrast with remaining keys 88a and 88c-88g, key 88b is designed to be retained in groove 86 of drive roller 28 by a spring biased, C-shaped retaining ring 102 having bent retaining ends 104. As shown in FIGS. 5, 7 and 8, the retaining ring 102 substantially surrounds the drive roller 28 forcefully engaging the key 88b in the groove 86 by means of the spring force of the ring 102. As will be described below, the retention of the key 88b by ring 102 in groove 86 of the drive roller 28 is a critical factor in maintaining the spaced relationship of the drive sprockets 76a-76b on the drive roller 28.

Figure 6:
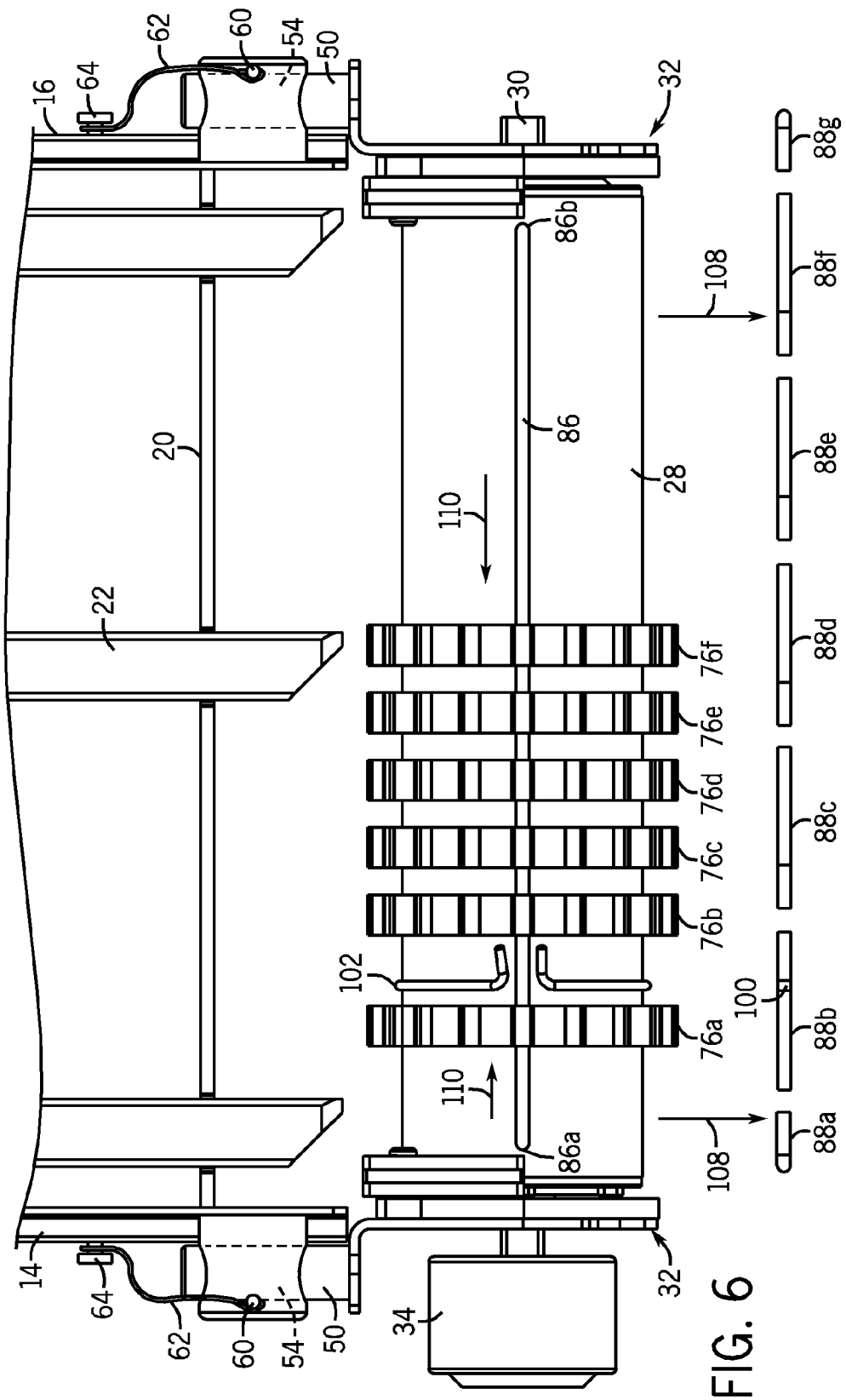
FIG. 6 is a top view similar to FIG. 5 of the retention system in a release position showing removal of keys of the drive sprocket retention system and subsequent movement of the drive sprockets for cleaning.

Referring now to FIGS. 5 and 7, thereshown is the drive sprocket retention system in a locked position. To arrive at the locked position, the drive sprockets 76a-76f and the locking keys 88a-88g are initially installed in a progressive manner along the drive roller 28. Before installation, all of the drive sprockets 76a-76f are positioned over the outer surface of the drive roller 28 near each other, as shown in FIG. 6. The installation process is best understood with reference to FIG. 7. First, key 88g is positioned such that its end 90 is in abutting relationship with blind end 86b of groove 86. Drive sprocket 76f is then slid along the drive roller 28 until the slot 98 in sprocket 76f receives the recessed end portion 94 of key 88g, such that the end 92 of the key 88g extends slightly beyond the second side 82 of drive sprocket 76f. Key 88f is then positioned in groove 86 such that the end 90 of key 88f engages end 92 of key 88g.

With key 88f in position, it should be understood from FIG. 7 that a stop shoulder 106 on key 88g abuts the first side 80 of drive sprocket 76f. The end 90 of the key 88f extends above the height of the recessed end portion 92 of key 88g, and thereby forms a stop shoulder which is engageable with the second side 82 of the drive sprocket 76f. The shoulders 90 and 106 thus substantially maintain the axial position of the drive sprocket 76f upon drive roller 28 while the registered engagement of the key 88g between sprocket 76f and drive roller 28 enables the drive sprocket 76f to be driven with drive roller 28.

Next, drive sprocket 76e is slid along the drive roller 28 until the first side 80 of drive sprocket 76e engages shoulder 106 of key 88f. The key 88e is then positioned in groove 86 such that stop shoulder 92 on key 88e and stop shoulder 106 on key 88f substantially maintain the axial positioning of drive sprocket 76e upon drive roller 28.

In like manner, the drive sprockets 76b-76d and keys 88c-88d are installed on drive roller 28. Once the key 88c has been installed and the drive roller 76b slid onto the recessed end portion, the key 88a is installed in the groove 86 and pushed to the aligned end 86a of the keyway. Once the key 88a is in place, the drive sprocket 76a is slid onto the recessed end 94, as shown in FIG. 7.

Once the drive sprocket 76a is pressed into contact with the shoulder 106 of the key 88a, the last key 88b is inserted into the groove 86. As illustrated in FIG. 7, the key 88b includes the stop shoulders 90, 92. The stop shoulder 92 engages the drive sprocket 76a while the stop shoulder 90 engages the drive sprocket 76b. Once the key 88b is in the position shown in FIG. 7, the retaining ring 102 is positioned around the drive roller 28 to retain the key 88b as illustrated.

Once the drive sprockets 76a-76f and the keys 88a-88g are positioned on drive roller 28, the shaft ends 30 of the drive roller 28 may be placed in the support assemblies 32 which are attached to the cross axles 54, as shown in FIG. 3. To install the drive roller 28, the pair of belt guides 40 are initially removed from the pivot pins 46 and the locking plates 38 are pivoted upward, as can best be understood in FIG. 3. Once the pair of locking plates 38 are pivoted upward, shaft ends 20 are guided into slots 44 on the support brackets 36 after which the locking plate 38 are pivoted downwardly so that the shaft ends 30 are captured between the walls of slots 44 and 68. At this point, the belt guides 40 are reinstalled and the conveyor belt 12 may be entrained around the drive sprockets 76a-76f with the conveyor belt being supported by the belt guides 40.

If it is desirable to effect a cleaning operation of the drive roller 28 as is typically required in sanitary conveyor applications, the drive sprocket retention system may be placed in a release position that allows the drive sprockets 76a-76f to move freely along the longitudinal length of drive roller 28.

Referring to FIG. 6, to attain the release position, retaining ring 102 is shifted out of engagement with key 88b so that key 88b can be removed from between sprockets 76a, 76b and from groove 86. The removal of key 88b allows sliding movement of drive sprocket 76a to the right on drive roller 28 away from key 88a, and also allows sliding movement of drive sprocket 76b to the left away from key 88c which enables keys 88a and 88b to be removed from groove 86. Each of the drive sprockets 76c-76f may now also be slidably moved in progression away from the respective keys 88d-88f so that all the keys 88a-88g are removed as depicted by the arrows 108.

Once the keys 88a-88g have been removed, the drive sprockets 76a-76f are moved to one collective area of the drive roller 28, such as on both sides of retaining ring 102 as shown by the arrows 110 in FIG. 6. After the drive sprockets 76a-76f have been relocated, the surface area of the drive roller 28 normally underlying the drive sprockets 76a-76f can be cleaned in a wash down operation or the like. Although FIG. 6 shows the sprockets 76a-76f moved inwardly towards retaining ring 102, it should be understood that the drive sprockets 76a-76f could moved in any manner from their normal operating position such that the outer surface of drive roller 28 can be cleaned. It should be further understood that the drive sprockets 76a-76f are prevented from sliding off the drive roller 28 due to the support assemblies 32 at the opposite ends of the drive roller 28.

Following cleaning, the keys 88a-88g are again progressively installed in the groove 86, and the sprockets 76a-76f and the retaining ring 102 are re-engaged with the respective keys 88a-88g to automatically reestablish the desired spacing of the drive sprockets 76a-76f on drive roller 28 and the driving engagement between the drive roller 28 and the drive sprockets 76a-76f.

Figure 2:
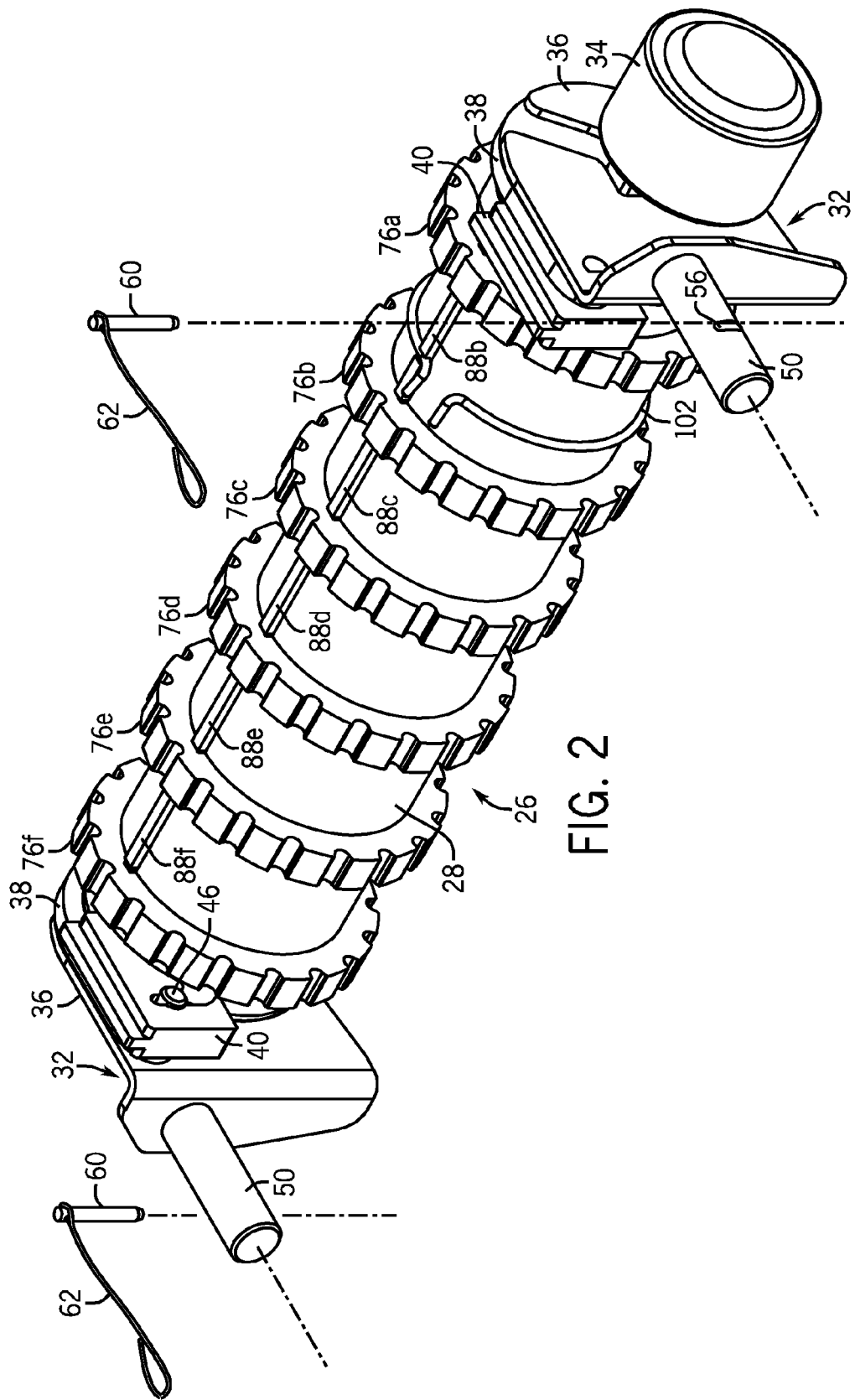
FIG. 2 is an enlarged rear perspective view of the drive arrangement, the drive retention system and the support assemblies shown separated from the conveyor assembly.

Should it be desirable upon disengagement of the conveyor belt 12 from the drive sprockets 76a-76f, the pins 60 may be pulled from the cross axles 54 to allow the entire assembly of the drive roller 28, the drive sprockets 76a-76f, the drive sprocket retention system and the support assemblies 32 to be separated from the conveyor assembly 10 as shown in FIG. 2. Locking plates 38 may be pivoted upwardly and the belt guides 40 removed so that the shaft ends 30 can be removed from the support brackets 36. From this point, the drive sprocket retention system can be placed in the release position as previously described to enable a complete disassembly of the drive sprockets 76a-76f, the keys 88a-88g and the retaining ring 102 from drive roller 28.

In addition to removing the entire support assembly 32, it is also possible to remove just the drive roller 28 and drive sprockets 76a-76f for cleaning. To remove the drive roller 28, each of the belt guides 40 are first removed from the pivot pins 46, as best shown in FIGS. 2 and 3. Once the belt guides 40 have been removed, each of the locking plates 38 are pivoted upward to release the engagement between the end 30 of the drive roller and the shaft retaining slot 68 formed in the locking plate. Once the ends of the drive roller have been released, the entire drive roller can be lifted out of the shaft locating and retaining slot 44 formed in the first plate portion 42. Reinstallation of the drive roller 28 is carried out by reversing the steps described above.

As can be seen in FIG. 1, the locking plates 38 function to not only secure the drive roller in the position shown in FIG. 1, but also act as a guard to prevent items from contacting the rotating drive roller 28 through the shaft retention slot 44.

Thus, it should be seen that the disclosure provides a drive sprocket retention system employing a series of aligned recessed keys to substantially maintain the position of drive sprockets on a rotatable element, such as a drive roller, having a keyway without the use of threaded fasteners and tools. The retention system eliminates the possibility of such threaded fasteners loosening up and falling into the conveyor assembly which could contaminate food processing applications. The disclosure further provides support assemblies for conveniently locating, relocating and supporting the shaft ends of a drive roller equipped with drive sprockets at the end of a conveyor assembly. The support assemblies are easily attached and removed relative to the conveyor assembly without the need for threaded fasteners or tools.

Although the disclosure has been described in detail with a preferred version, other versions are possible. For example, for use with non-circular driven shafts in which the drive sprockets inherently rotate with the shaft, the shaft may be grooved and fitted with keys having recessed end portions that are received and retained in the side surfaces of the drive sprockets.

Various alternatives and further embodiments are contemplated as being within the scope of the following claims particularly pointing out and distinctly claiming the subject matter regarded as the invention.

I claim:

1. A drive arrangement for use with a conveyor assembly having a continuous conveyor belt supported by a conveyor frame having a pair of spaced side members, the drive arrangement comprising:

a driven rotatable element extending between the pair of spaced side members and located at one end of the conveyor frame, the rotatable element including an axial keyway;

a plurality of drive sprockets positioned along the rotatable element for engaging the conveyor belt to transmit a drive force between the rotatable element and the conveyor belt, each of the drive sprockets being freely movable along a longitudinal length of the rotatable element; and a drive sprocket retention system disposed between the drive sprockets and the rotatable element to substantially maintain a desired spacing between the drive sprockets, wherein the retention system includes a plurality of keys arranged in an end-to-end relationship in the axial keyway, each key having a recessed portion received and retained between a slot formed in one of the drive sprockets and the driven rotatable element without threaded fasteners, wherein the plurality of keys create the desired spacing between the plurality of drive sprockets.

2. The drive arrangement of claim 1, wherein the retention system is movable between a locked position and a release position, wherein the spacing between the drive sprockets is substantially fixed when the retention system is in the locked position, and the drive sprockets are independently movable along the longitudinal length of the rotatable element when the retention system is in the release position.

3. The drive arrangement of claim 1, wherein engagement of the recessed portion of the key between each drive sprocket and the rotatable element prevents rotational movement of each drive sprocket relative to the rotatable element.

4. The drive arrangement of claim 1, wherein the end-to-end relationship of the keys forms a first set of stop shoulders engageable with the drive sprockets.

5. The drive arrangement of claim 4, wherein the keys having recessed portions form a second set of stop shoulders engageable with the drive sprockets.

6. The drive arrangement of claim 1, wherein the plurality of keys includes one key which is fixed on the rotatable element between a pair of the drive sprockets by a retaining ring surrounding the rotatable element.

7. The drive arrangement of claim 1, wherein the drive sprockets have inner walls forming bores that are slidably accommodated on the rotatable element, each of the walls having the slots formed therein for receiving the recessed portions of the keys.

8. The drive arrangement of claim 1, wherein the rotatable element is mounted between a pair of support assemblies which are removably attached to the side members of the conveyor frame.

9. The drive arrangement of claim 8, further comprising a pair of locking plates each pivotally mounted to one of the support assemblies, wherein the locking plates are movable between a locking position to retain the rotatable element within the support assemblies and a release position to permit the removal of the rotatable element from the support assemblies.

10. A drive sprocket retention system for use in a belt conveyor in which a plurality of drive sprockets each having a slot are mounted on a rotatable element for directing driving a conveyor belt and maintaining spacing between the drive sprockets, the retention system having an axial keyway formation, the retention system comprising:

a key arrangement disposed in the keyway formation of the rotatable element, wherein the key arrangement includes a plurality of keys arranged in an end-to-end relationship, wherein a recessed portion of each key is received and retained between the slot of one of the drive sprockets and the rotatable element without threaded fasteners to substantially maintain a desired spacing between the drive sprockets along the rotatable element, wherein at least one key is fixed on the rotatable element by a retaining ring.

11. The retention system of claim 10, wherein engagement of the recessed portion of the key between each drive sprocket and the rotatable element prevents rotational movement of the drive sprockets relative to the rotatable element.

12. The retention system of claim 10, wherein the end-to-end relationship of the keys forms a first set of stop shoulders engageable with the drive sprockets.

13. The retention system of claim 12, wherein keys having recessed end portions form a second set of stop shoulders engageable with the drive sprockets.

14. The retention system of claim 10, wherein the at least one key is fixed on the rotatable element between a pair of drive sprockets by the retaining ring that surrounds the rotatable element.

15. A drive arrangement for use with a conveyor assembly having a continuous conveyor belt supported by a conveyor frame having a pair of spaced side members, the drive arrangement comprising:

a driven rotatable element extending between the pair of spaced side members and located at one end of the conveyor frame;

a plurality of drive sprockets positioned along the rotatable element for engaging the conveyor belt to transmit a drive force between the rotatable element and the conveyor belt, each of the drive sprockets being freely movable along a longitudinal length of the rotatable element; and a drive sprocket retention system disposed between the plurality of drive sprockets and the rotatable element to substantially maintain a desired spacing between the drive sprockets, wherein the retention system is defined by a plurality of keys disposed in an axial keyway formed in the driven rotatable element, and provided with recessed end portions received and retained between the drive sprockets and the driven rotatable element, the keys being arranged in an end-to-end relationship along the keyway such that the keys by themselves form stop shoulders engaged against sides of the drive sprockets to prevent axial movement of the drive sprockets on the driven rotatable element and maintain a desired spacing between the drive sprockets.

16. The drive arrangement of claim 15 wherein the driven rotatable element is a drive roller having a shaft supported between the pair of spaced side members.

17. The drive arrangement of claim 16, wherein the drive roller is mounted between a pair of support assemblies removably attached to the spaced side members by a pin connection.

18. The drive arrangement of claim 15, wherein the retention system is movable between a locked position and a release position, wherein the spacing between the drive sprockets is substantially fixed when the retention system is in the locked position, and the drive sprockets are independently movable along the longitudinal length of the rotatable element when the retention system is in the release position.

19. The drive arrangement of claim 15, wherein the plurality of keys includes one key which is fixed on the rotatable element between a pair of the drive sprockets by a retaining ring surrounding the rotatable element.

\* \* \* \* \*